United States Patent [19]
Morag et al.

[11] Patent Number: 6,058,399
[45] Date of Patent: May 2, 2000

[54] FILE UPLOAD SYNCHRONIZATION

[75] Inventors: Guy Morag, Kohav Yair; Yoav Samet, Tel Aviv; Leonid Entin, Modi'in, all of Israel; Yoni Rosenbaum, Portola Vally, Calif.

[73] Assignee: ColorDesk, Ltd., Tel Aviv, Israel

[21] Appl. No.: 08/919,862

[22] Filed: Aug. 28, 1997

[51] Int. Cl.[7] .................................................. G06F 17/30
[52] U.S. Cl. ...................... 707/201; 707/202; 709/217; 709/203
[58] Field of Search ..................... 707/201, 202, 707/203, 205; 709/217, 203; 348/7, 13; 710/113, 58, 61; 345/328

[56] References Cited

U.S. PATENT DOCUMENTS

| | | | |
|---|---|---|---|
| 5,319,455 | 6/1994 | Hoarty et al. ........................... | 348/7 |
| 5,392,422 | 2/1995 | Hoel et al. ............................. | 710/113 |
| 5,721,827 | 2/1998 | Logan et al. ........................... | 709/217 |
| 5,732,216 | 3/1998 | Logan et al. ........................... | 709/203 |

*Primary Examiner*—Wayne Amsbury
*Assistant Examiner*—Thu-Thao Havan
*Attorney, Agent, or Firm*—Fenster & Company Patent Attorneys, Ltd.

[57] ABSTRACT

A method of synchronizing an interactive connection and a non-interactive data transfer connection between a client and a service provider, comprising:

creating an interactive connection;

creating a data transfer connection; and generating a session ID which is associated with the two connections.

48 Claims, 5 Drawing Sheets

6,058,399

FILE UPLOAD SYNCHRONIZATION

FIELD OF THE INVENTION

The present invention relates to the field of computer communications and especially to synchronizing file transfer operations with a remote interactive application, over the Internet.

BACKGROUND OF THE INVENTION

Many services can be purchased over the Internet. Some of these services only require a client to select an item from a catalog, provide payment for the item, or send other small amounts of information to the service provider. This type of information is usually sent as part of the interaction with the service provider, such as by typing. Other types of services require the client to send a considerable amount of information to the service provider. This type of information may be sent by e-mail or by uploading a file to the service provider. Files are typically uploaded either using an FTP protocol which is run independently of the WWW session, or by typing the file name(s) to a Java applet, downloaded from the service provider, as part of the session. Due to security requirements, current at this time, the file names must be manually typed for a Java applet to be able to read the files. One problem with files uploaded using an FTP protocol is that, in general, anybody may access these files.

One particular application, image manipulation, may require that large amounts of data in many separate files may be required to be sent to a service provider. All of the images which are to be manipulated/printed/developed must reach the service provider. High image quality of the final product of the service usually requires transmitting large files.

The above described solutions are cumbersome and may require a more than minimum level of computer literacy on the part of the customer. As can be appreciated, it would be desirable to provide a method of uploading large amounts of data, which method will be more user friendly than the above described methods.

SUMMARY OF THE INVENTION

It is an object of some embodiments of the present invention to provide a method of uploading large amounts of data to a service provider, which method is substantially transparent to a customer.

It is an object of some embodiments of the present invention to provide a method of uploading data which renders the data inaccessible to third parties.

It is an object of some embodiments of the present invention to provide a secure and/or convenient method of uploading data which uses a maximum number of available commercial components, both for the client and for the service provider.

A first aspect of some embodiments of the present invention relates to automatic uploading of files to a service provider. In a preferred embodiment of the invention, a customer is supplied with a software package which includes access to the service provider through a computer network. When such access is requested by the customer, the software package preferably creates two sessions, an interactive session, such as one based on a WWW protocol and a file upload session through which active data (files) are automatically uploaded to the service provider, to be used as part of the interactive session or to be processed further in accordance with choices made during the interactive session with the service provider. Active data may include a set of data, defined as "active" by the customer or, alternatively, data which has been manipulated by the customer to a predefined extent. For example, in an image manipulation setting, all images which were previewed by the customer may be considered active, even if these images are not open anymore. Alternatively, only open images will be considered to be active. Alternatively or additionally, only images marked as active by the customer will be considered to be active. Alternatively or additionally, there are several levels of activity and once all the files in one level of activity are uploaded, the files from the next level of activity are uploaded.

A second aspect of some embodiments of the present invention relates to modifying the upload of data files responsive to the customer's interaction with the service provider. For example, if there are 10 active files, numbered 1–10, files 1–5 have been uploaded and file 6 is in the process of upload, if the customer indicates that he will only require files 4, 5 and 8, the uploading of file 6 will preferably be terminated and only file 8 will thereafter be uploaded. In another example, if a client first places an order which requires file 7, the upload order of the files will be changed so that file 7 is uploaded as soon as possible. It should be noted that should the customer delay his instructions long enough, all of the files will be uploaded. Thus, a sophisticated customer can reduce the amount of transmitted data by indicating which of the active files he wants uploaded, while an unsophisticated customer will not be required to do so. In a preferred embodiment of the invention, once the customer finishes the ordering process, any files which he did not include in an order are considered to be non-required. Alternatively or additionally, when a user cancels an order, files pertaining to that order are considered to be non-required.

A third aspect of some embodiments of the present invention relates to assuring the arrival of all the required files. One issue is that some file uploads will not succeed. In a preferred embodiment of the invention, files are automatically reloaded if their first loading does not succeed. Preferably, files which have been indicated as not being necessary for the interaction are not reloaded Alternatively, files are reloaded only when they are indicated as necessary for the interaction. Another issue is that the customer may modify the files after they are uploaded. In a preferred embodiment of the invention, such modified files are automatically uploaded to the service provider. Alternatively or additionally, the service provider program prompts the customer for instructions whether the old or new versions of the file is desired. Alternatively or additionally, files to be uploaded are placed in a special protected directory where the customer will not have direct access to them. Another issue is that the customer may attempt to terminate an interaction before all the files are uploaded. Preferably, the service provider prompts the customer for instructions, preferably allowing the customer to cancel any of the not-yet uploaded files. Alternatively or additionally, the file upload continues even after the interaction is stopped. Alternatively or additionally, the file upload is continued at a later session. Alternatively or additionally, the missing files are e-mailed, preferably, being identified with a unique session ID. Preferably if the latter session is not upcoming, the service provider sends a notification, such as by e-mail, to the customer, reminding him of the not-yet uploaded files.

A fourth aspect of some embodiments of the invention relates to synchronizing the file upload session and the interactive session by providing a single unique ID for the two sessions. Preferably, the uploaded files are associated with the unique session ID so that the interactive session can determine which files have been uploaded and to enable the uploading of files to be canceled via the interactive session. In a preferred embodiment of the invention, the session ID is used to differentiate multiple users and/or multiple sessions from a single user. In a preferred embodiment of the invention a single session ID is used to enable a customer to breakdown a single session into a plurality of interactive sessions. Preferably, when a customer connects to the service provider, the service provider prompts the customer to respond if he wants to continue with a previous, unfinished, session. Alternatively, the client program generates this prompt responsive to locally stored information. Alternatively or additionally, the customer can make a special request to continue a previous session.

A fifth aspect of some embodiments of the present invention relates to associating a password with the session ID. When files are uploaded, such as using an FTP protocol, they are uploaded into a protected location, using the user and/or the password. Preferably, the password and/or a user name are selected from a bank of names, which are reused. If the bank is large enough, it is very difficult to break in to the system using an old password. Preferably, the service provider associates a particular customer with a user/password combination and does not allow connections to that user other than from the particular customer, for a certain limited period of time. Alternatively, each session is assigned a unique password and/or user name, preferably related to the unique session ID.

A sixth aspect of some embodiments of the present invention is related to a process structure preferred for preferred embodiments of the invention Preferably, the service provider includes a WWW server, for the interactive session and an FTP server for the file upload session. Preferably, both servers are standard commercial software products, so that, preferably, they can be controlled externally, as black boxes. Preferably, each of the FTP server and the WWW server run on different machines. In a preferred embodiment of the invention, the service provider includes a synchronizing process which supplies the unique session ID and synchronizes the operation of the FTP server and the WWW server. Alternatively or additionally, the customer software may be provided with a synchronizing process. Alternatively or additionally, at least part of the synchronization is achieved from a third location. In a preferred embodiment of the invention, the customer software includes a standard WWW browser.

It should be appreciated that in some embodiments of the present invention only one or several of the above described aspects will be practiced.

There is therefore provided in accordance with a preferred embodiment of the invention, a method of synchronizing an interactive connection and a non-interactive data transfer connection between a client and a service provider, comprising:

creating an interactive connection;

creating a data transfer connection; and generating a session ID which is associated with the two connections.

There is also provided in accordance with a preferred embodiment of the invention, a method of transferring data between a client and a service provider, comprising:

creating an interactive connection between the client and the service provider;

creating a data transfer connection between the client and the server;

automatically uploading data files from the client to the server, responsive to the interactive connection.

Preferably, automatically uploading comprises automatically stopping uploading of data files which are indicated through the interactive connection as being unnecessary.

Alternatively or additionally, automatically uploading comprises automatically repeating uploading of data files which are indicated through the interactive connection as being necessary and which were modified at the client between being first uploaded and being second uploaded.

Alternatively or additionally, automatically uploading comprises automatically uploading only data files which are indicated through the interactive connection as being necessary.

Alternatively or additionally, the method comprises generating a single session ID for the two connections. Preferably, automatically uploading comprises associating said uploaded data files with said session ID. Alternatively or additionally, the method comprises providing, from the service provider, a user name and wherein automatically uploading data files comprises automatically uploading data files using the provided user name. Preferably, the method comprises:

associating said user name with a particular client; and rejecting, for a limited period of time, connections to the user name, which are not from the particular client.

There is also provided in accordance with a preferred embodiment of the invention, apparatus for uploading data files, comprising:

a file upload connection server;

an interactive connection server; and a synchronizer which synchronizes the operation of the two connections.

Preferably, said synchronizer generates a single session ID for two associated sessions, each on a different one of said servers. Alternatively or additionally, said synchronizer receives from a client, through said interactive connection, a list of file locations and instructs said file upload connection client to upload said files to said server. Alternatively or additionally, said synchronizer and said interactive connection server are integrated as a single process.

Alternatively or additionally, said synchronizer and said file upload server are integrated as a single process.

Alternatively, said file upload server and said interactive connection server are each on a separate computer.

There is also provided in accordance with a preferred embodiment of the invention, apparatus for uploading data files, comprising:

a file upload connection client;

an interactive connection client; and a client synchronizer which synchronizes the operation of the two connections.

Preferably, said clients and said synchronizer are integrated in a single client computer.

Alternatively or additionally, the apparatus comprises:

a file upload connection server; and an interactive connection server, wherein said servers are on connected to said clients by computer communications. Preferably, the apparatus comprises a server synchronizer which synchronizes, together with the client synchronizer the operation of the two connections.

There is also provided in accordance with a preferred embodiment of the invention, apparatus for synchronizing a file upload connection and an interactive connection, comprising:

an file upload monitor, which monitors the operation of a file upload server without direct communication with the file upload server;

an interactive data generator, which generates data in a format suitable for an interactive connection server, and a synchronizer, wherein said synchronizer causes said interactive data generator to generate data responsive to input from said file upload monitor and which sends the generated data through the interactive connections server.

Preferably, said synchronizer generates a username for use of said file upload connection Preferably, said file upload server is connected to a file upload client and said username is transmitted to said file upload client, for connecting to said file upload server using said username.

Alternatively or additionally, said file upload server is a FTP server. Alternatively or additionally, said interactive connection server is a WWW server.

In a preferred embodiment of the invention, the apparatus comprises a second synchronizer, which communicates with the synchronizer and controls the uploading files to the file upload server responsive to the communications. Preferably, said second synchronizer communicates with said first synchronizer on a connection used for uploading the files.

There is also provided in accordance with a preferred embodiment of the invention, a method of local file information display, comprising:

uploading a list or fle information for a plurality of local files to a remote server;

generating a data display at the remote server; and locally displaying said data display, wherein said data display includes local data responsive to said local file information.

Preferably, said uploading a list comprises automatically uploading a list. Alternatively or additionally, said local data comprises local images corresponding to said local file information, wherein said images are not yet uploaded to said remote server.

There is also provided in accordance with a preferred embodiment of the invention, a method of synchronized file upload, from a upload client to an upload server, comprising:

connecting from said client to said server;

receiving information at said client from said server; and uploading files from said client to said server, utilizing said information.

Preferably, said server comprises a file upload server and a software component, external to said file upload server, which monitors the operation of said file upload server and which transmits said information to said client. Alternatively or additionally, said information comprises a username and wherein said uploading files comprises uploading files using said username. Alternatively or additionally, said information comprises an indication of at least one file whose upload failed and wherein uploading files comprises repeating the upload of at least said one file.

BRIEF DESCRIPTION OF THE DRAWINGS

The present invention will be more clearly understood from the detailed description of the preferred embodiments with reference to the accompanying figures, in which.

DETAIL DESCRIPTIONS OF PREFERRED EMBODIMENTS

Figure 1:
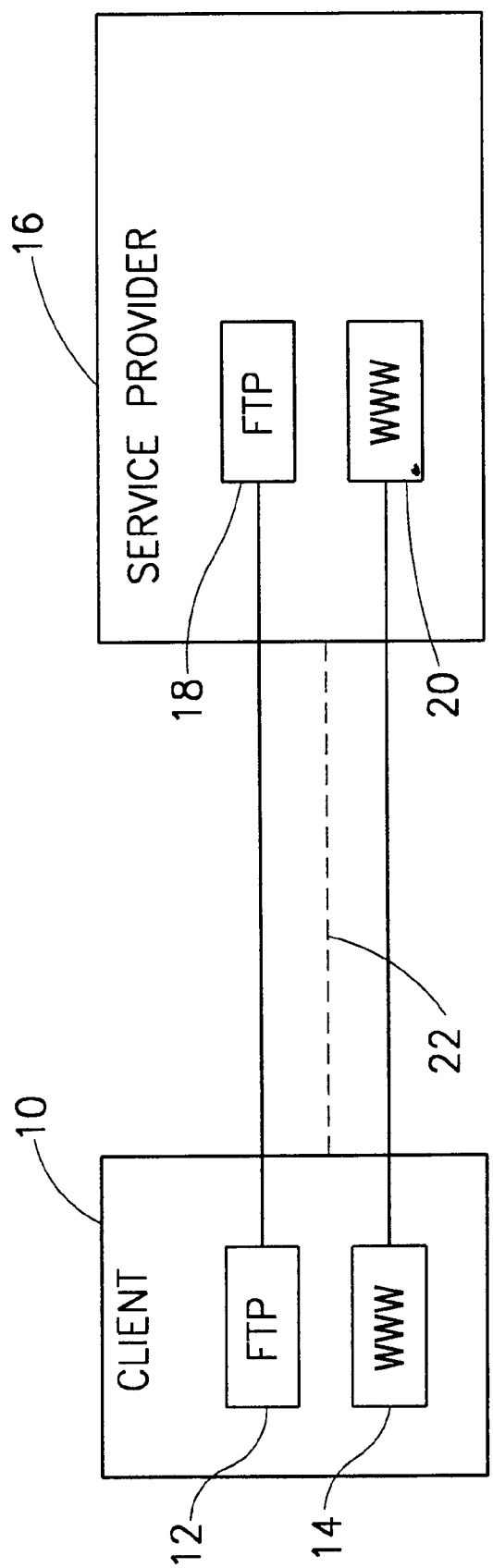
FIG. 1 is a schematic block diagram of a file upload system, in accordance with a preferred embodiment of the invention.

FIG. 1 is a schematic block diagram of a file upload system, in accordance with a preferred embodiment of the invention The system includes a client 10 and a service provider 16. At least two connections are operational between client 10 and service provider 16: a file upload connection and an interactive connection. Preferably, the file upload connection is an FTP connection, preferably between an FTP client 12 in client 10 and an FTP server 18 in service provider 16. Alternatively to an FTP connection, a direct file transfer protocol may be used, such as Kermit. Preferably, the interactive connection is a WWW connection between a WWW client 14 in client 10 and a WWW server 20 in service provider 16. In a preferred embodiment of the invention, FTP server 18 and WWW server 20 are synchronized using a synchronization connection 22.

In a preferred embodiment of the invention both the connections are on a single physical line. Alternatively, two lines may be provided, for example, the WWW connection being on a LAN which is connected to an Internet, while the file upload being on a dedicated modem.

In a preferred embodiment of the invention, service provider 16 comprises a plurality of computers and at least FTP server 18 and WWW server 20 are each run on a separate computer.

The operation of the system, in accordance with a preferred embodiment of the invention is easily explained with reference to a particular application. The reference application used herein is an image manipulation application, preferably associated with a digital camera or a scanner device.

In the preferred image manipulation application, the scanner and/or camera are provided with an image manipulation program for manipulating images generated by the camera/scanner. One option of the image manipulation program is connecting to an outside service provider for special services which cannot be performed at home, for example, creating photographic-type hard copies or printing images on plastic objects.

Preferably, when the customer selects an outside service provider, an interactive connection is made through the Internet. However, other types of public computer networks may be used instead. The interactive connection is made between WWW client 14, which is preferably a standard browser and WWW server 20 which is preferably a commercially available WWW server. The image manipulation program preferably also opens a file upload is connection, preferably, also through the Internet. However, in an alternative preferred embodiment of the invention, the two connections may be through two different networks. The two networks may share the same physical layer, or they may use different physical layers. Service provider 16 preferably provides a unique session ID to the combined FTP and WWW connection. In a preferred embodiment of the invention, the FTP connection is started only after such a unique ID is provided by WWW server 20.

Figure 2:
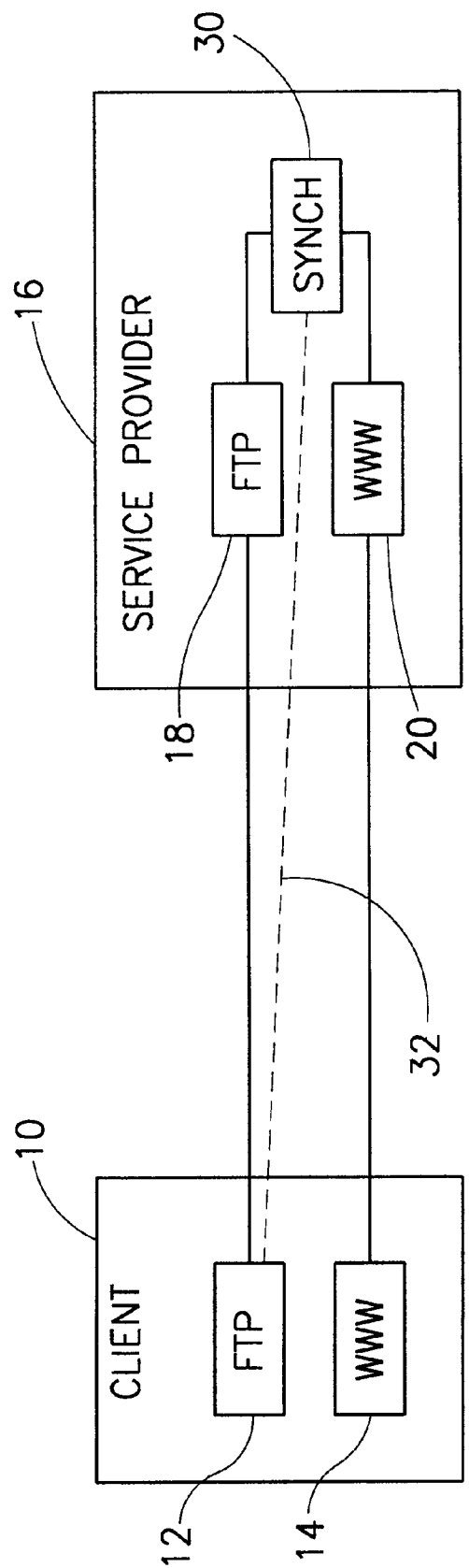
FIG. 2 is a schematic block diagram of a file upload system, in accordance with a preferred embodiment of the invention, showing a synchronizing process as part of a service provider.
Figure 3:
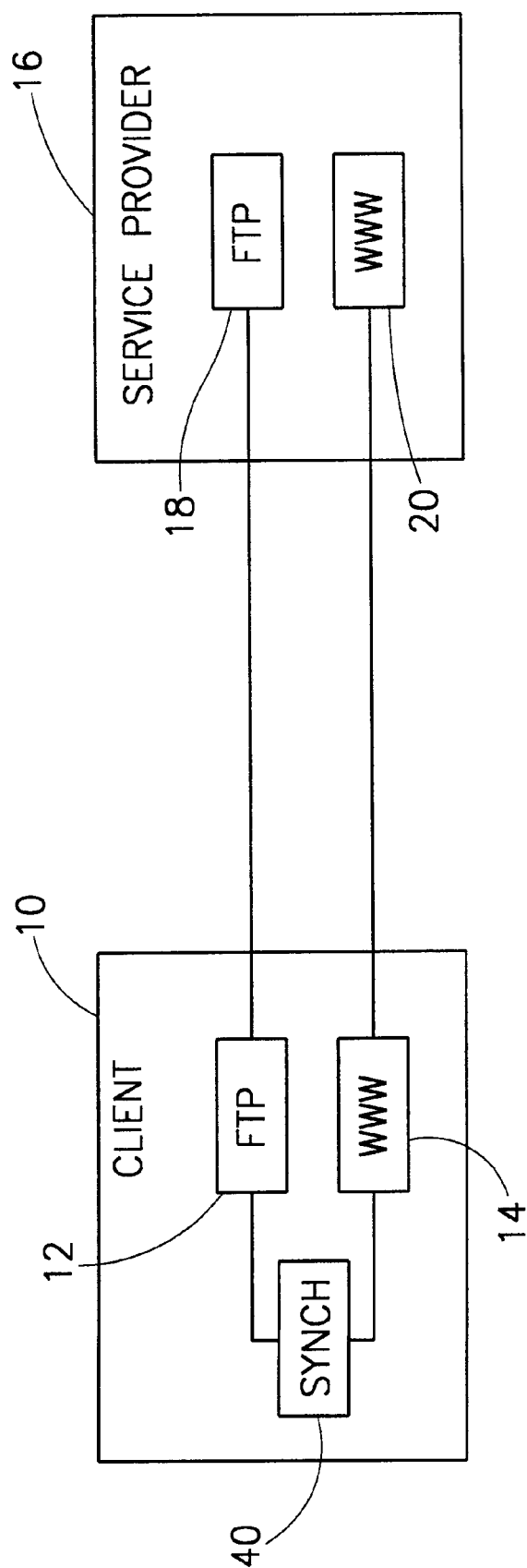
FIG. 3 is a schematic block diagram of a file upload system, in accordance with a preferred embodiment of the invention, showing a synchronizing process as part of a client.
Figure 4:
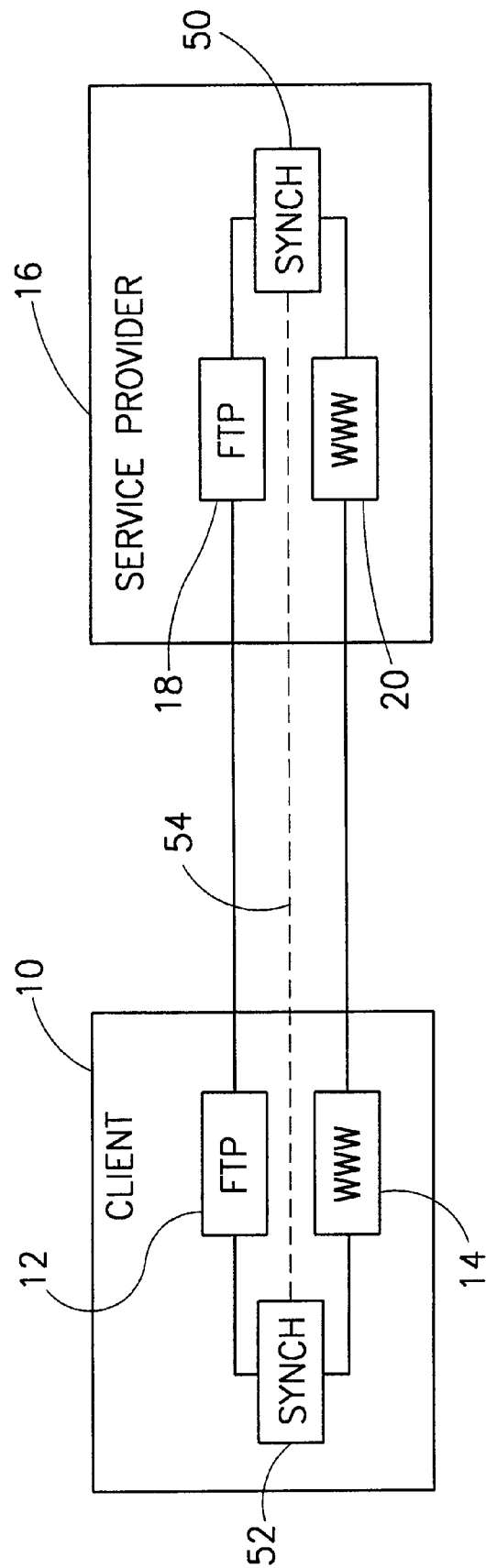
FIG. 4 is a schematic block diagram of a file upload system, in accordance with a preferred embodiment of the invention, showing a synchronizing process as part of both a client and a service provider.
Figure 5:
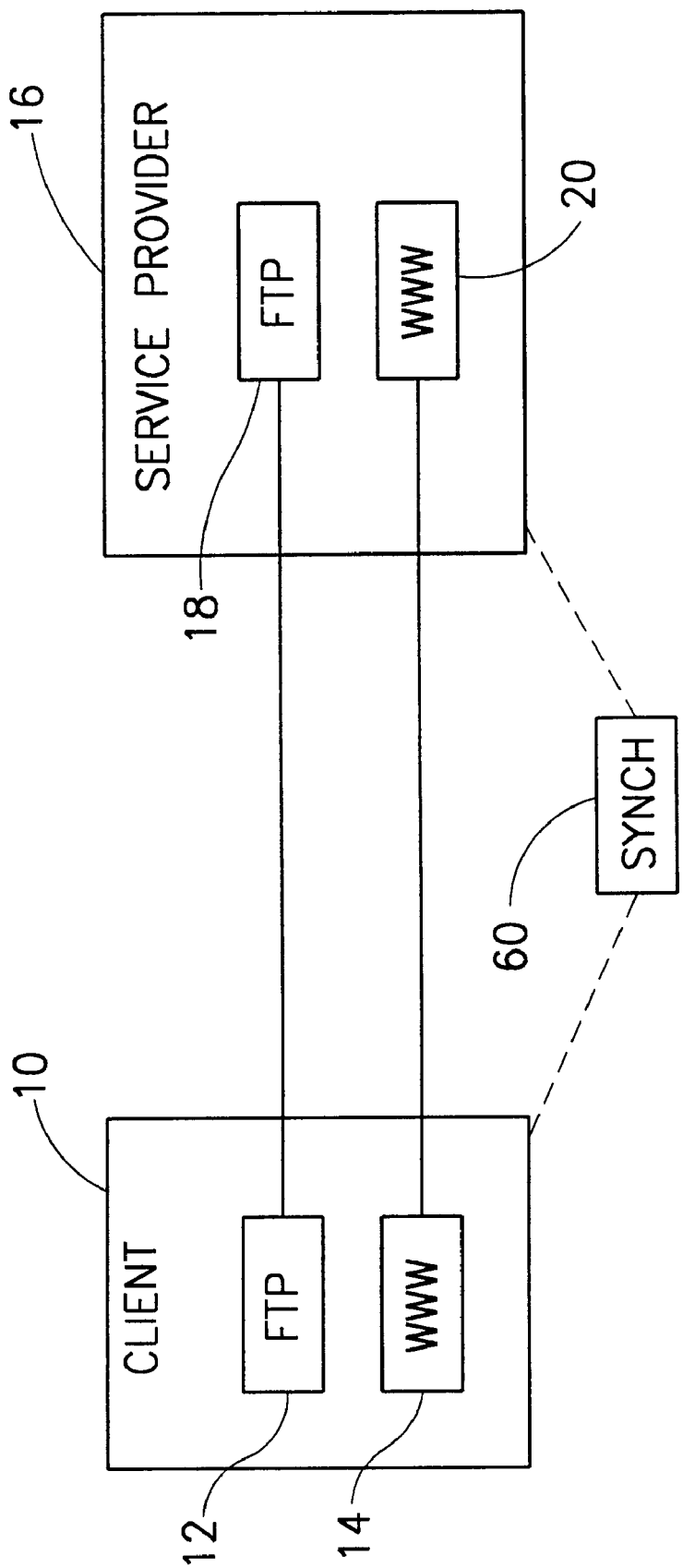
FIG. 5 is a schematic block diagram of a file upload system, in accordance with a preferred embodiment of the invention, showing a synchronizing process as part of a third party.

In a preferred embodiment of the invention, synchronization connection 22 is used to synchronize the two servers. FIGS. 2.5 describe four possible configurations for synchronizing client 10 and service provider 16, which will be described in greater detail below. In the configuration of FIG. 2, a synchronization process 30 is incorporated in service provider 16. In the configuration of FIG. 3, a synchronization process 40 is incorporated in client 10. In the configuration of FIG. 4, a synchronization process 50 is incorporated in service provider 16 and a synchronization process 52 is incorporated in client 10. In the configuration of FIG. 5, at least part of the synchronization is provided by a third party synchronization process 60.

Many features of preferred embodiments of the invention, described below, are performed by the synchronization process, the location of the synchronization process will affect both the way in which theses features are implemented and whether they are possible to implement In particular, some security features are not possible or will have a lower utility in some of the configurations.

In a preferred embodiment of the invention, FTP client 14 and FTP server 18 are standard commercial FTP programs. Alternatively, a limited FTP client which can only upload images in response to a uniquely provided session ID, is provided with the client software. Alternatively, an open FTP client is used, which can be easily integrated into the software at client 10. An open FTP client is especially preferred when at least part of the synchronization is by a program at client 10. In such a case, the synchronization process is preferably integrated with the FTP client. Furthermore, the FTP client and the synchronization process preferably share a TCP/IP connection.

Preferably, FTP client 12 starts uploading active image files as soon as an FTP connection is established, which is typically only after a session ID is obtained. Preferably, the upload starts with an upload of a list of all the active files. Thereafter, files are uploaded from FTP client 12 to FTP server 18, responsive to file names on the list. Typically, FTP client 12 initiates the upload, since FTP server 18 may have limited control options. Alternatively, the list of active files is provided through the WWW connection. Active files are a set of files which are considered by the image manipulation software to be relevant for the required interaction with the external service provider. Some examples of definitions for active files include: all the files which were previewed in the current run of the image manipulation program, all files which are still open in the program, all files which were marked as "OK" by the user of the program and/or a predefined set of files.

In a preferred embodiment of the invention, the user can interact with the service provider even before any images are uploaded, by viewing and manipulating thumbnail images, full size images or image names. This information may be displayed locally by the WWW client, by selectively displaying files from the above provided list of file names and/or locations, as thumbnail files, full size images and/or file names. Alternatively or additionally, the thumbnail images may be generated locally by the image manipulation software and passed to the WWW client, by passing their location to the WWW server. Alternatively, thumbnail images are also uploaded to the service provider, preferably before uploading the complete image files. These thumbnail images are preferably used by the service provider to give the user an idea of what the manipulated image will look like.

As can be appreciated, at some point in the process, the user will be required to indicate, to the service provider, which of the active images are to be serviced. In some cases, making no selection will automatically select all the images. When the user, through the interactive connection, selects certain images, the FTP connection preferably stops uploading any unselected files and from that point on uploads only the selected files.

In some cases, the user will finish ordering the service before the selected files are all uploaded. In such a case, service provider 16 will notify the user of his options, through the WWW connection. One option might be to cancel services related to images which were not uploaded. Another option might be to wait until all the images are uploaded. Yet another option might be to continue the upload in the background, while discontinuing the WWW connection. Still another option might be to continue the session later.

In a preferred embodiment of the invention, a user may stop a session and then return to the session at a later time utilizing the unique session ID to identify the session. Preferably, the existence of an unfinished session is identified either by client 10 or by service provider 16 and the user may be provided with an option to reconnect to an old session. In some cases a new unique session ID number may be provided even when an old session is continued.

In a preferred embodiment of the invention, the unique session ID is unique to a particular client. In one example, the unique session ID include a secret client code which is embedded in the client software. One example of such a code is the client's IP address, preferably appended to a time stamp.

In many cases, some of the upload attempts will fail and some files will fail to be uploaded. Preferably, the FTP connection will not retry the failed files until all the active files have been uploaded and/or until certain files are selected as participating in the service. Preferably, unselected files will not be reloaded.

In some cases, the user will manipulate images after they are uploaded. Preferably, the service provider will automatically upload the modified images. Alternatively, the service provider will prompt the user, through the WWW connection, of his options, which may include using the old file, using the new file or canceling the file. Alternatively, files to be uploaded are frozen, such as by copying the files to a special upload directory.

Referring to FIG. 2, in a preferred embodiment of the invention, synchronization between the interactive connection and the file transfer connection is achieved using synchronization process 30 in service provider 16. In this embodiment, the synchronization information is preferably carried on the same TCP/IP connection which is used for the file upload, albeit, preferably using a different port. Preferably, synchronizing process 30 monitors connections to FTP server 18. In this configuration, the unique session ID is preferably generated by synchronization process 30.

In a preferred embodiment of the invention, file upload is monitored indirectly, either by communication between FTP client 12 and synchronizing process 30 or by using uploaded files as semaphores. Synchronizing process 30 can determine whether a file was uploaded successfully by checking if a corresponding upload-OK file was uploaded In a prefer embodiment of the invention, FTP client 12 is a stand-alone commercial program. The fle upload is preferably started by WWW browser 14 spawning the FTP application. Preferably, the spawn command is generated by synchronizing process 30 and passed through WWW server 20 to WWW browser 14. Preferably, a separate spawn command is generated for each file to be uploaded. Alternatively or additionally, the spawn command includes unique session ID information and/or user/password information (described below). Alternatively or additionally, the file upload is achieved by downloading a program, preferably a batch file, to upload the files. It should be appreciated that in many WWW browsers, spawning executables is restricted for security reasons. It should also be appreciated that the FTP program is usually located in a standard location for a particular operating system. Additionally or alternatively, the image manipulation program uploads the location of the FTP command. Additionally or alternatively, the FTP program is included in the image manipulation software package. Thus, it is possible, in some embodiments of the present invention, to only allow executing a particular program from WWW browser 14.

In a preferred embodiment of the invention, the step of receiving a unique session ID includes receiving a temporary user name and/or a password. Preferably, FTP client 12 uploads the image files, preferably to a unique location, using the provided user name and/or password. Additionally or alternatively, each uploaded file is associated with a unique session ID, preferably, by storing the file in a directory associated with the session ID or by appending the session ID to the name. In one preferred embodiment of the invention, the unique session ID is used to generate a unique user name and/or password. Alternatively, a bank of available user names may be used, from which a user name is cyclically selected. Thus, a user name will generally not be used simultaneously by two different customers. In some cases, especially when there are more active connections than user names, two customers will share a single user name. However, this should pose no problem, since files are still individually identified using their associated session IDs. Alternatively or additionally, the user name and/or the password are encrypted in the session ED, preferably using a public key encryption scheme. Thus, unique identification of the owner of the connection can be assured.

In a preferred embodiment of the invention, the passwords are periodically changed, such as every day.

User names assigned to a previous session are preferably frozen until the session is terminated Alternatively, data files associated with a session are removed from the particular user account and arc moved to a new user which is provided with the next connection.

In a preferred embodiment of the invention, synchronizing process 30 vets incoming FTP connections and limits connections to a particular user name to those connections arriving from a particular client. The client is preferably identified by its name, a user supplied self identification such as a software code and/or the location of the client. Thus, connecting to a particular user account is farther protected from attempts to break into the system. Alternatively, synchronizing process 30 can disconnect suspicious connections. Alternatively or additionally, this technique is used to conserve user names, by using the same user name for all connections from a particular local. Alternatively or additionally, this technique is used to stop uploads of files which are not necessary. In a preferred embodiment of the invention, client 10 uploads all the files and synchronizing process 30 stops the upload of unnecessary files, such as by disconnecting the FTP connection.

Referring to FIG. 3, in a preferred embodiment of the invention, synchronization between the interactive connection and the file transfer connection is achieved using synchronization process 40 in client 10. Preferably, synchronization process 40 and FTP client 12 are integrated. Preferably, FTP client 12 is conducted using open standard code, which is generally available as compiled libraries. In this embodiment, preferably no synchronization connection is necessary. Alternatively, synchronization information is preferably carried on the same TCP/IP connection which is used for the file upload. Preferably, such information is provided by file down load.

In a preferred embodiment of the invention client 10 provides a unique session ID, for example by providing a unique user identification and a local session number. This is especially relevant where a client will reuse the same service several times and therefore obtains a unique user identification from the service. In some cases, client 10 will have a pre-provided user name to which directory the files will be uploaded. However, in most cases, client 10 will be an infrequent or one time user of the provided service and will therefore not be assigned a unique user name in advance. Alternatively, client 10 provides a unique session ID, such as based on its IP number and/or a time stamp. It should be noted that in this embodiment, usually no user name will be assigned by service provider 16.

Referring to FIG. 4, in a preferred embodiment of the invention, synchronization between the interactive connection and the file transfer connection is achieved using synchronization process 50 in service provider 16 and synchronization process 52 in client 10. In this embodiment, the synchronization between the two synchronizing processes is preferably carried on the same TCP/IP connection which is used for the file upload. Alternatively, a separate TCP/IP control connection may be provided. In a preferred embodiment of the invention, the session ID is provided by client 10, while the user name is provided by service provider 16. As described above for other embodiments, synchronizing process 52 is preferably integrated with FTP client 12 and preferably generates the unique session ID. With reference to FIG. 2, it should be appreciated that in preferred embodiments of the invention, the image manipulation software does perform some synchronization, such as generating a list of active images to be uploaded and/or generating a unique session ID. However, this software does not generally coordinate the file upload and the interactive session once they have started.

Referring to FIG. 5, in a preferred embodiment of the invention, synchronization between the interactive connection and the file transfer connection is achieved using synchronization process 60 external to service provider 16 and client 10.

Synchronization process 60 may be in addition to or instead of the synchronizing processes in the embodiments of FIGS. 2–4, although, preferably, there is also a synchronizing process in service provider 16. In one example, synchronizer 60 is located at a second service provider and WWW server 20 is either a proxy to a second WWW server at the second provider or located at the second service provider. Files are uploaded to service provider 16 and synchronizer 60 detects their upload and performs a service responsive to the upload and instructions from WWW server 20. Proper uploading of files may be detected using semaphore files, as described above. It should be noted that this monitoring of the uploading may be performed remotely, such as through an FTP connection Alternatively or additionally, service provider 16 further uploads the files to the second service provider. Synchronizer 60 will preferably provide a user name to be passed or directly transmitted to client 10. In another example, it is the FTP server which is at the second service provider, while synchronizing process 60 is preferably at service provider 16. Thus, files are upload directly to the second service provider, while the interactive session is handled at service provider 16.

Although preferred embodiments of the present invention have been described mostly with reference to a WWW connection and an FTP connection, other types of connection protocols may be used. Further, more than two connections may be current, for example, more than one interactive connection and/or more Oman one file upload connection.

It should be noted that although many of the above embodiments require both an interactive session and a file upload session, some aspects of the invention do not require an interactive session. In particular, password verification for file upload does not require an interactive session, nor does automatic reloading of files which were not successfully uploaded.

In a preferred embodiment of the invention, an FTP file upload server and an FTP file upload client each include a synchronizing portion. The FTP client synchronizer portion contacts the FTP server synchronizer portion and requests a password. The files are uploaded using the password and/or a unique session ID which may be generated at the client or at the server, as described above. If a file is not successfully uploaded, the FTP server synchronizer portion can detect this, as described above, and instruct the FTP client synchronizer portion to upload the file again. Thus, secret and guaranteed uploading of files, using a public network can be achieved, with minimal required changes in an FTP client and with no changes in an FTP server, except the addition of external programs. This embodiment is especially useful, where it is desirous for the images to be uploaded prior to contacting a service provider and the image upload time is long. Automatic upload of images may require user instructions. Alternatively, active images and/or images which have been processed in a certain way are automatically uploaded unless otherwise instructed by the user.

Attached herewith is a software appendix of a system for synchronized file upload using an interactive connection, in accordance with a preferred embodiment of the invention. The software system is not completely debugged, however, it will operate, in most cases, in a suitable fashion. The file upload client the one provided with Microsoft visual C/C++ version 5.0, the programming language in which the client is programmed. The server is programmed in Java It will be appreciated by a person skilled in the art that the present invention is not limited by what has thus far been described. Rather, the present invention is limited only by the claims which follow.

We claim:

1. A method of synchronizing an interactive connection and a non-interactive data transfer connection between a client and a service provider, comprising:

creating an interactive connection;

creating a data transfer connection; and generating a single session ID for the two connections, which ID associates between the two connections.

2. A method according to claim 1, wherein the data transfer connection is created responsive to the interactive connection.

3. A method according to claim 1, wherein the data transfer connection and the interactive connection are created concurrently.

4. A method according to claim 1, wherein creating the data transfer connection comprises creating a connection substantially only for uploading data files from the client to the service provider.

5. A method according to claim 1, wherein creating the data transfer connection comprises creating a connection which is used for uploading files from the client to the service provider and wherein creating the interactive connection comprises creating a connection which transmits information relating to the uploaded files.

6. A method according to claim 5, wherein the interactive connection transmits indications of the uploaded files.

7. A method according to claim 1, wherein creating the data transfer connection comprises creating a connection which is used for uploading data files from the client to the service provider and wherein creating the interactive connection comprises creating a connection which transmits information relating to the upload of the files.

8. A method according to claim 7, comprising modifying the upload of data files responsive to at least one command on the interactive connection.

9. A method according to claim 7, wherein modifying the upload of data files comprises modifying the order of upload of the files.

10. A method according to claim 7, wherein modifying the upload of data files comprises canceling the upload of one or more of the files.

11. A method of transferring data between a client and a service provider, comprising:

creating an interactive connection between the client and the service provider;

creating a data transfer connection between the client and the service provider; and automatically uploading data files from the client to the service provider, on the data transfer connection, responsive to the interactive connection.

12. A method according to claim 11, wherein automatically uploading comprises automatically stopping uploading of data files which are indicated through the interactive connection as being unnecessary.

13. A method according to claim 11, wherein automatically uploading comprises automatically repeating uploading of data files which are indicated through the interactive connection as being necessary and which were modified at the client between being first uploaded and being second uploaded.

14. A method according to claim 11, wherein automatically uploading comprises automatically uploading only data files which are indicated through the interactive connection as being necessary.

15. A method according to claim 11, comprising generating a single session ID for the two connections.

16. A method according to claim 15, wherein automatically uploading comprises associating said uploaded data files with said session ID.

17. A method according to claim 15, comprising providing, from the service provider, a user name and wherein automatically uploading data files comprises automatically uploading data files using the provided user name.

18. A method according to claim 17, comprising:

associating said user name with a particular client; and rejecting, for a limited period of time, connections to the user name, which are not from the particular client.

19. A method according to claim 11, wherein creating the data transfer connection comprises creating the connection responsive to the creation of the interactive connection.

20. A method according to claim 11, wherein automatically uploading comprises automatically determining an order of upload of the data files.

21. A method according to claim 11, wherein automatically uploading comprises automatically determining which files are uploaded.

22. A method according to claim 11, wherein automatically uploading data files comprises uploading responsive to previewing of the data files.

23. A method according to claim 11, wherein automatically uploading data files comprises uploading responsive to modifying the data files.

24. A method according to claim 11, wherein automatically determining which files are uploaded comprises deciding by a computer which files are uploaded.

25. Apparatus for uploading data files, comprising:

a file upload connection server;

an interactive connection server; and a synchronizer which synchronizes the operation of respective connections formed by the file upload connection server and by the interactive connection server.

26. Apparatus according to claim 25, wherein said synchronizer generates a single session ID for two associated sessions, each on a different one of said servers.

27. Apparatus according to claim 25, wherein said synchronizer receives from a client, through said interactive connection, a list of file locations and instructs said file upload connection client to upload said files to said server.

28. Apparatus according to claim 25, wherein said synchronizer and said interactive connection server are integrated as a single process.

29. Apparatus according to claim 25, wherein said synchronizer and said file upload server are integrated as a single process.

30. Apparatus according to claim 25, wherein said file upload server and said interactive connection server are each on a separate computer.

31. Apparatus according to claim 25, wherein the synchronizer monitors connections to the file upload connection server.

32. Apparatus for uploading data files, comprising:

a file upload connection client;

an interactive connection client; and a client synchronizer which synchronizes the operation of respective connections formed by the file upload connection client and by the interactive connection client.

33. Apparatus according to claim 32, wherein said clients and said synchronizer are integrated in a single client computer.

34. Apparatus according to claim 32, comprising:

a file upload connection server; and an interactive connection server, wherein said servers are connected to said clients by computer communications.

35. Apparatus according to claim 34, comprising a server synchronizer which synchronizes, together with the client synchronizer the operation of the two connections.

36. Apparatus for synchronizing a file upload connection and an interactive connection, comprising:

an file upload monitor, which monitors the operation of a file upload server without direct communication with the file upload server;

an interactive data generator, which generates data in a format suitable for an interactive connection server; and a synchronizer, wherein said synchronizer causes said interactive data generator to generate data responsive to input from said file upload monitor and which sends the generated data through the interactive connections server.

37. Apparatus according to claim 36, wherein said synchronizer generates a username for use of said file upload connection.

38. Apparatus according to claim 37, wherein said file upload server is connected to a file upload client and wherein said username is transmitted to said file upload client, for connecting to said file upload server using said username.

39. Apparatus according to claim 36, wherein said file upload server is a FTP server.

40. Apparatus according to claim 36, wherein said interactive connection server is a WWW server.

41. Apparatus according to claim 36, comprising a second synchronizer, which communicates with the synchronizer and controls the uploading files to the file upload server responsive to the communications.

42. Apparatus according to claim 41, wherein said second synchronizer communicates with said first synchronizer on a connection used for uploading the files.

43. A method of local file information display, comprising:

uploading a list of file information for a plurality of local files to a remote server;

generating a data display at the remote server; and locally displaying said data display, wherein said data display includes local data not downloaded from the remote server, responsive to said local file information.

44. A method according to claim 43, wherein said uploading a list comprises automatically uploading a list.

45. A method according to claim 43, wherein said local data comprises local images corresponding to said local file information, wherein said images are not yet uploaded to said remote server.

46. A method of synchronized file upload, from an upload client to an upload server, comprising:

connecting from said client to said server;

receiving information comprising a username at said client from said server; and uploading files from said client to said server, utilizing said information.

47. A method according to claim 36, wherein said server comprises a file upload server and a software component, external to said file upload server, which monitors the operation of said file upload server and which transmits said information to said client.

48. A method according to claim 36, wherein said information comprises an indication of at least one file whose upload failed and wherein uploading files comprises repeating the upload of at least said one file.

* * * * *

UNITED STATES PATENT AND TRADEMARK OFFICE
CERTIFICATE OF CORRECTION

| | | |
|---|---|---|
| PATENT NO. | : 6,058,399 | Page 1 of 1 |
| APPLICATION NO. | : 08/919862 | |
| DATED | : May 2, 2000 | |
| INVENTOR(S) | : Guy Morag | |

It is certified that error appears in the above-identified patent and that said Letters Patent is hereby corrected as shown below:

Column 14, line 54, "36" should read --46--

Column 14, line 59, "36" should read --46--

Signed and Sealed this

Twenty-fifth Day of August, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 6,058,399 | Page 1 of 1 |
| APPLICATION NO. | : 08/919862 | |
| DATED | : May 2, 2000 | |
| INVENTOR(S) | : Guy Morag et al. | |

It is certified that error appears in the above-identified patent and that said Letters Patent is hereby corrected as shown below:

Column 11, Line 17, "Oman" should read --than--

Signed and Sealed this

Fifth Day of April, 2011

David J. Kappos
*Director of the United States Patent and Trademark Office*